(12) United States Patent
Nir

(10) Patent No.: US 8,869,356 B2
(45) Date of Patent: Oct. 28, 2014

(54) WATERPROOF ZIPPER AND MANUFACTURING METHOD THEREFOR

(75) Inventor: Dan Nir, Kibutz Yiron (IL)

(73) Assignee: Paskal Zippers Ltd., Kibutz Yiron (IL)

( * ) Notice: Subject to any disclaimer, the term of this patent is extended or adjusted under 35 U.S.C. 154(b) by 8 days.

(21) Appl. No.: 13/522,196

(22) PCT Filed: Jan. 24, 2010

(86) PCT No.: PCT/IL2010/000055
§ 371 (c)(1),
(2), (4) Date: Jul. 13, 2012

(87) PCT Pub. No.: WO2011/089588
PCT Pub. Date: Jul. 28, 2011

(65) Prior Publication Data
US 2012/0311828 A1    Dec. 13, 2012

(51) Int. Cl.
| | |
|---|---|
| A44B 19/32 | (2006.01) |
| B29C 45/14 | (2006.01) |
| A44B 19/04 | (2006.01) |
| B29C 45/33 | (2006.01) |
| B29L 31/26 | (2006.01) |

(52) U.S. Cl.
CPC ............... *A44B 19/32* (2013.01); *B29C 45/33* (2013.01); *B29L 2031/26* (2013.01); *B29C 45/14573* (2013.01); *A44B 19/04* (2013.01)
USPC .............................................. 24/389; 24/403

(58) Field of Classification Search
USPC .................... 24/389, 384, 403, 398, 434, 435
See application file for complete search history.

(56) References Cited

U.S. PATENT DOCUMENTS

| | | | |
|---|---|---|---|
| 4,160,636 A | 7/1979 | Magherini | |
| 4,765,038 A * | 8/1988 | Kasai | 24/389 |
| 6,519,826 B1 | 2/2003 | Ortlieb | |
| 7,056,417 B2 | 6/2006 | Haws et al. | |
| 7,181,810 B2 * | 2/2007 | Fernando | 24/389 |
| 7,591,051 B2 * | 9/2009 | Kusayama et al. | 24/387 |
| 2006/0257054 A1 | 11/2006 | Henn et al. | |
| 2006/0282995 A1 | 12/2006 | Liou | |
| 2008/0131244 A1 | 6/2008 | Murray | |
| 2008/0248146 A1 | 10/2008 | Yang | |

OTHER PUBLICATIONS

International Search Report from PCT/IL2010/000055 dated May 21, 2010.

* cited by examiner

*Primary Examiner* — Victor Batson
*Assistant Examiner* — Abigail Morrell
(74) *Attorney, Agent, or Firm* — Workman Nydegger

(57) ABSTRACT

In one aspect, the present invention is directed to a waterproof zipper (2) comprising: joining teeth (6), each consolidated by a consolidating block (24) and contactably grasping the tape (4) of the zipper (2), separating the tape (4) from the opposite tape of said zipper; and a soft seal (8), wrapping and expanding (towards 48) each of the two tapes (4) beyond the joining line (78) of the tapes (4); thereby applying pressure between the soft seals (8) at the joining line (78), resulting in tight sealing of the two soft seals (8).

9 Claims, 12 Drawing Sheets

STEP 1

STEP 2

STEP 3

STEP 4

STEP 5

STEP 6

WATERPROOF ZIPPER AND MANUFACTURING METHOD THEREFOR

FIELD OF THE INVENTION

The present invention relates to the field of zippers. In particular, the present invention relates to the field of waterproof zippers.

BACKGROUND OF THE INVENTION

A zipper is a popular device for temporarily joining two edges of a fabric. Zippers include two tapes, each having dozens or hundreds of metal or plastic teeth. A manually operated slider joins and separates the teeth, according to the sliding direction.

Zippers have the advantage of speed and ease of joining the two sides, compared to fastening laces or buttons.

In addition, zippers offer improved sealing, and as such, are used in raincoats. An additional improvement of the sealing feature of zippers includes coating a zipper's tape with sealing material.

One of the drawbacks of the prior art zippers is that the coating of a zipper does not seal the zipper as a whole, i.e. the teeth and other areas remain uncovered. As a result, water penetrates between the teeth, or between the tape and the teeth.

Prior art solutions of coating the teeth prior to grasping the teeth to the tape commonly require separation of each tooth to one unit above the tape and another below the tape, and engaging the two units through the tape.

However, these zippers are disadvantaged by non-firm grasping of the teeth to the tape.

It is an object of the present invention to provide a waterproof zipper, having improved sealing in comparison to the prior art.

Other objects and advantages of the invention will become apparent as the description proceeds.

SUMMARY OF THE INVENTION

In one aspect, the present invention is directed to a waterproof zipper (2) comprising:
 joining teeth (6), each consolidated by a consolidating block (24) and contactably grasping the tape (4) of the zipper (2), separating the tape (4) from the opposite tape of said zipper; and
 a soft seal (8), wrapping and expanding (towards 48) each of the two tapes (4) beyond the joining line (78) of the tapes (4);
 thereby applying pressure between the soft seals (8) at the joining line (78), resulting in tight sealing of the two soft seals (8).

The soft seal (8) preferably penetrates into (30, 24 in FIG. 7) each of the teeth (6), beyond the thickness of said consolidating block (24) of each of said teeth (i.e to the distance between 80 and 80).

The soft seal (8) preferably expands between (38 in FIG. 6) adjacent teeth (44,46) of the tape.

Each of the joining teeth (6) may comprise a slot (30) at the joining unit (22) thereof, allowing the penetration of the soft seal (8) therein.

The distance between reeds (26,28) of the slot (30) preferably is larger than the thickness of the consolidating block (24) of the teeth (6), for allowing the penetration of the soft seal (8) into the slot (30) beyond the thickness of the consolidating block (24).

The zipper may further comprise an upper stair (80) and a lower stair (80) between the slot (30) and the consolidating block (24).

The material of the soft seal (8) may comprise Thermoplastic Elastomer (TPE).

The soft seal (8) may further comprise a stamp (32), for providing information.

In another aspect, the present invention is directed to a method for manufacturing a waterproof zipper (2) comprising the steps of:
 inserting (step 4) into a mold (62 in FIG. 11) a tape (4) of a zipper (may be 12) grasped with teeth (6); and
 injecting (step 5) a liquid seal (84) into the mold (62), thereby providing a soft seal (8) wrapped on the tape and teeth.

The method may further comprise the step of inserting a mold insert (68) into a slot (30) of each of the teeth such that the injection is beyond the joining line (78) between that tape and the opposite tape.

The inserting step of said tape into said mold may comprise spacing (74) between the tape (4) and the mold (62).

The injecting step may comprise penetrating the liquid seal into each of the teeth beyond the thickness of the consolidating block of each of the teeth.

The injecting step may comprise expanding the liquid seal between adjacent teeth of the tape.

The tape inserted into the mold may be non-waterproof.

The injecting step may comprise stamping information.

The foregoing embodiments of the invention have been described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings.

It should be understood that the drawings are not necessarily drawn to scale.

DETAILED DESCRIPTION OF PREFERRED EMBODIMENTS

The present invention will be understood from the following detailed description of preferred embodiments, which are meant to be descriptive and not limiting. For the sake of brevity, some well known prior art methods, systems, procedures, components, circuits, and so on, have not been described in detail.

Figure 1:
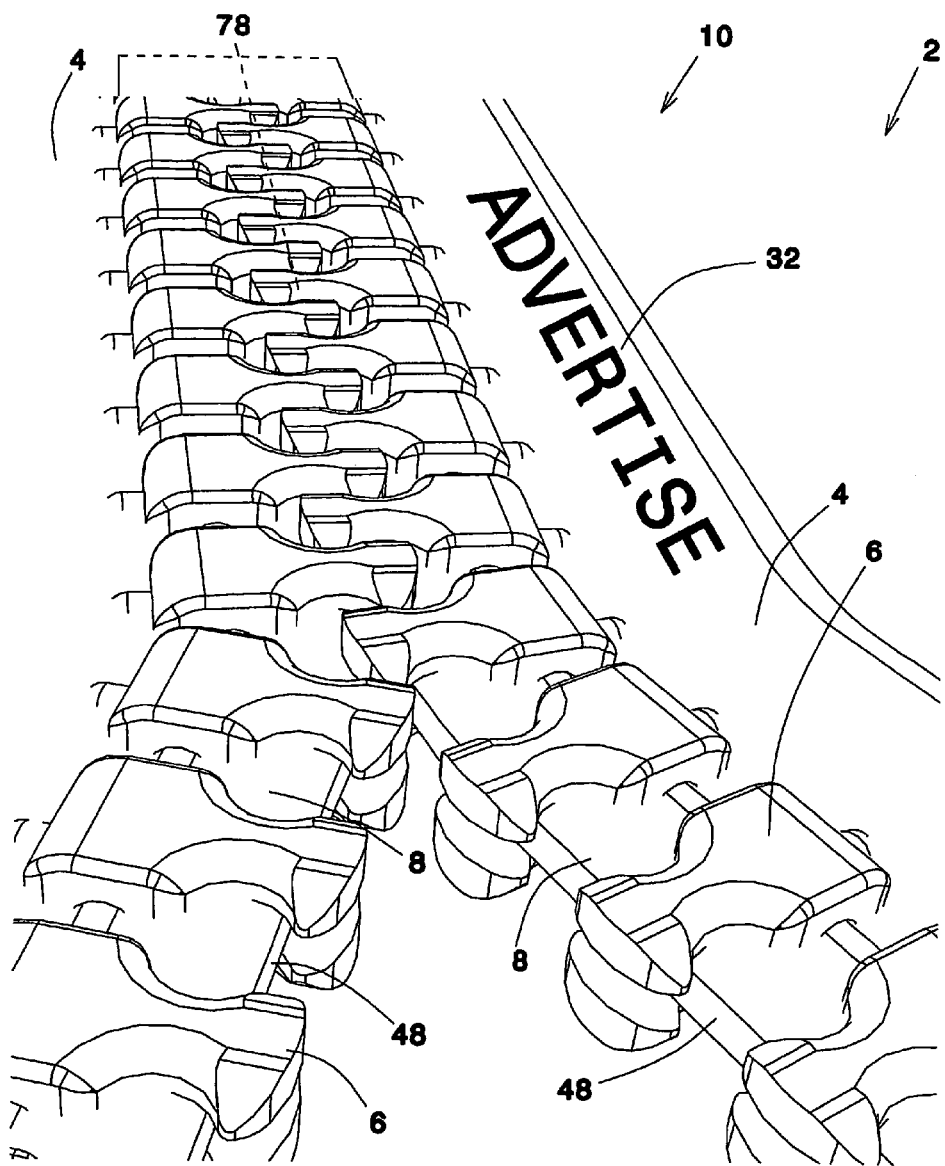
FIG. 1 is a side view of a zipper according to one embodiment of the present invention.

FIG. 1 is a side view of a zipper according to one embodiment of the present invention.

A waterproof zipper 2 includes two tapes 4, fastened one to the other by teeth 6. Each of tapes 4 and teeth 6 thereof includes a soft seal 8, such that the two soft seals 8 form together, when tightened one towards the other, a waterproof seal at the fastened zone 10 of waterproof zipper 2.

A thermoplastic is a plastic, usually a polymer, which can be remelted and remolded.

Teeth 6 are made of non-deformable metal or plastic, preferably thermoplastic.

An elastomer is an elastic and deformable polymer, often named, rubber, primarily used for sealing.

The material of soft seal 8 may be Thermoplastic Elastomers (TPE), which is a family of polymers, combining the features of thermoplastics and elastomers.

Thermoplastic Elastomers (TPE) can be repeatedly stretched without permanently deforming the shape of the part. Also, they may be processed by conventional thermoplastic techniques such as injection molding, extrusion and blow molding.

Examples of TPEs are styrenic block copolymers, polyolefin blends (TPOs), elastomeric alloys, thermoplastic polyurethanes (TPUs), thermoplastic copolyesters and thermoplastic polyamides.

Figure 2:
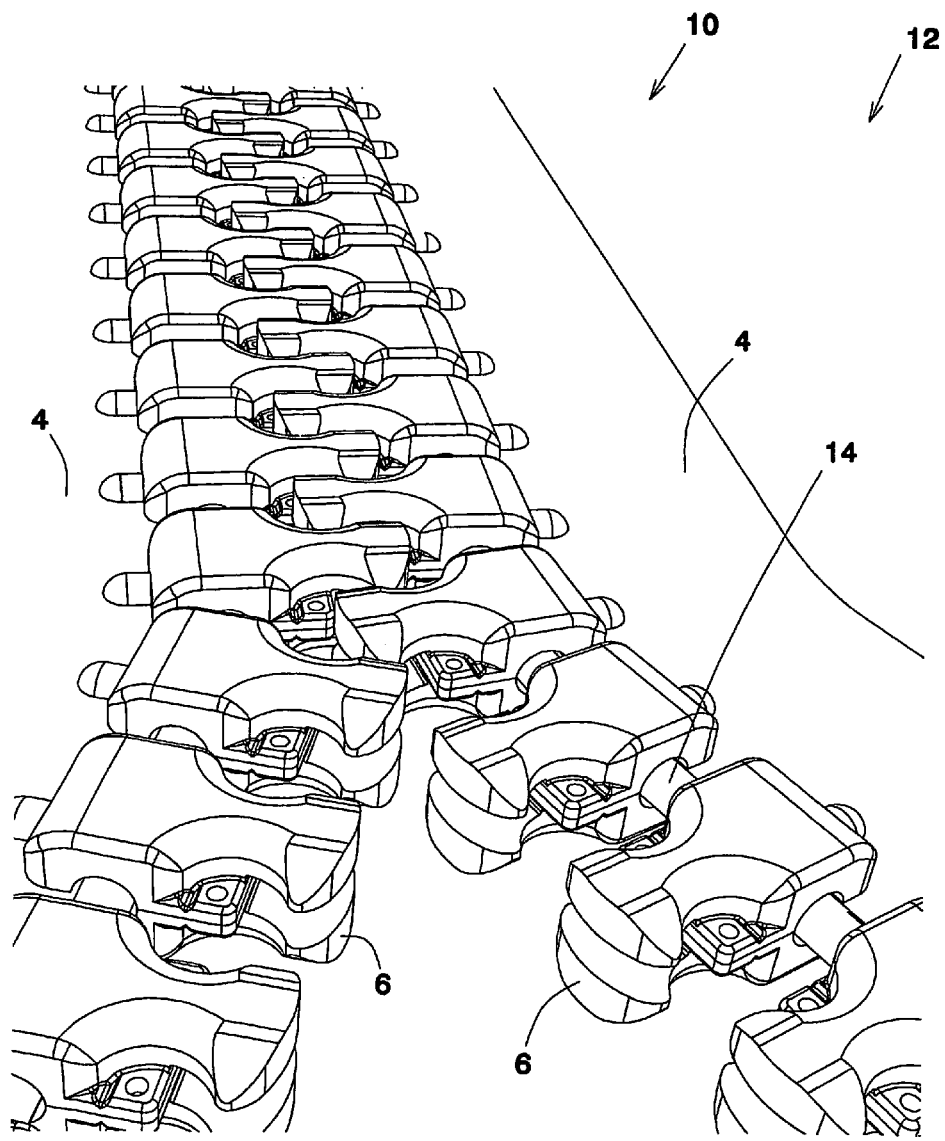
FIG. 2 is a side view of a non-waterproof zipper.

FIG. 2 is a side view of a non-waterproof zipper.

A non-waterproof zipper 12 includes two tapes 4, fastened one to the other by teeth 6. However, zipper 12 does not include seals 8. Thus, zipper 12 is not sealed at the fastened zone 10 thereof, and thus is not waterproof.

Figure 3:
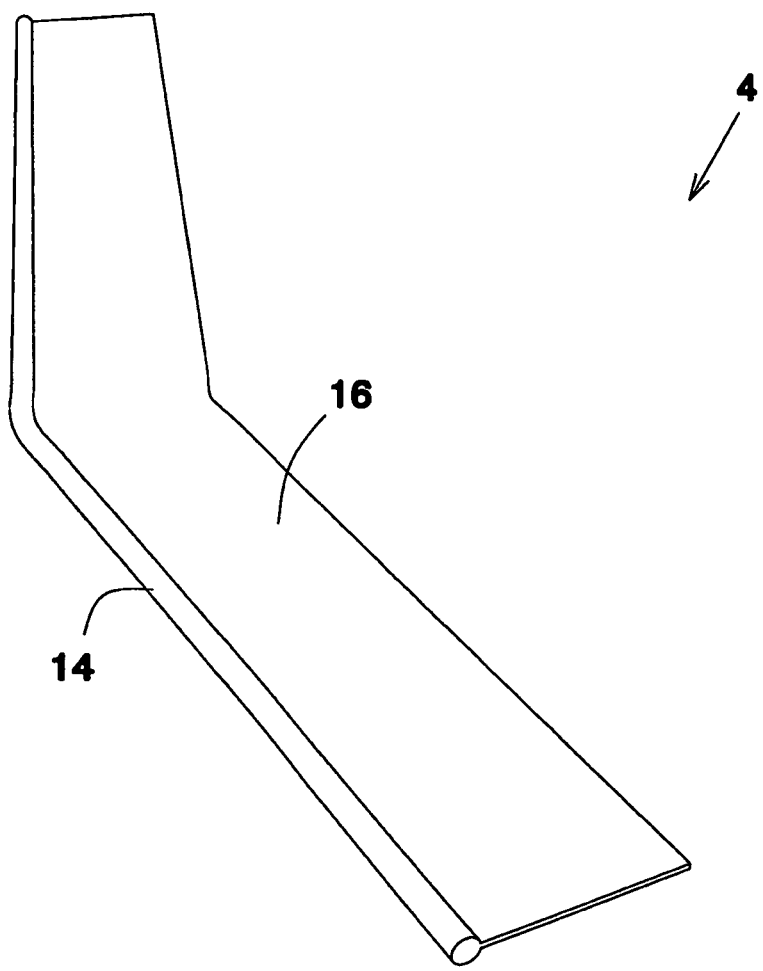
FIG. 3 shows a tape of the non-waterproof zipper and of the zipper of the present invention.

FIG. 3 shows a tape of the non-waterproof zipper and of the zipper of the present invention.

Tape 4 includes a wide thin stripe 16, for being sewn to a fabric; and a narrow thickened stripe 14 providing a firm basis to each of teeth 6.

Figure 4:
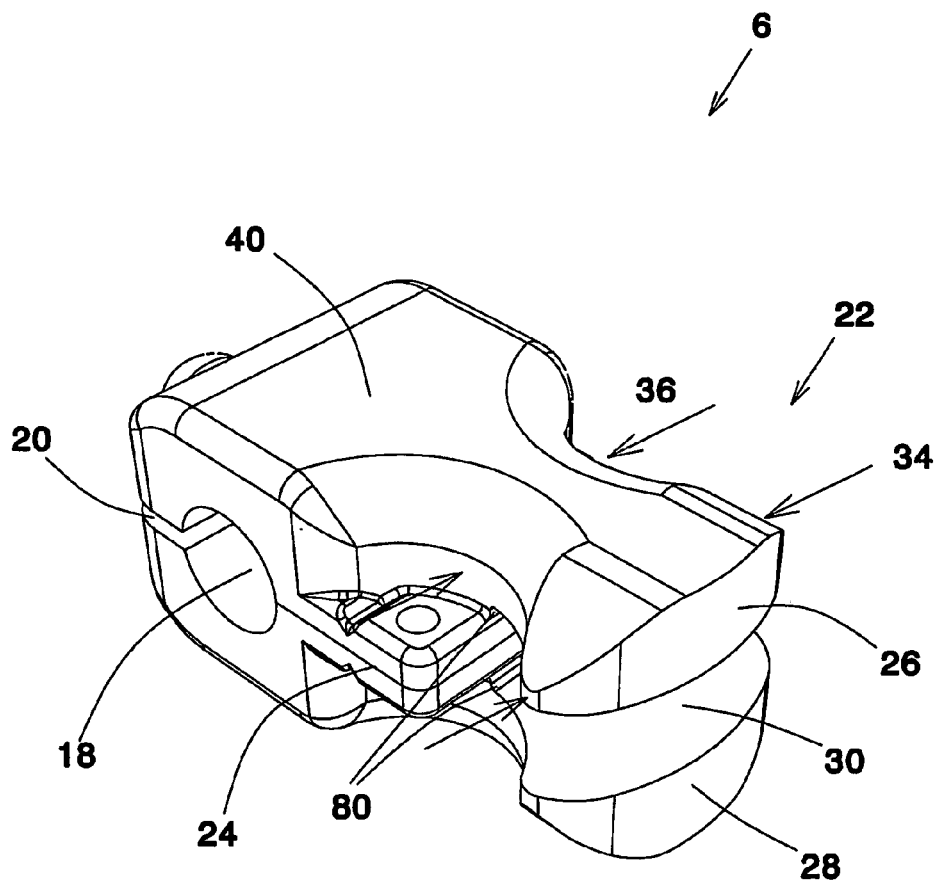
FIG. 4 shows a tooth of the zipper, according to one embodiment of the present invention.

FIG. 4 shows a tooth of the zipper, according to one embodiment of the present invention.

Tooth 6 includes at the first side thereof a grasping unit 40, for grasping tape 4. Grasping unit 40 includes a groove 20, which suits the thickness of thin stripe 16, and a cylindrical recess 18, having a diameter which suits thickened stripe 14.

Tooth 6 includes at the opposite side a joining unit 22, for joining the joining units of the adjacent teeth 6. Joining unit 22 is split to an upper reed 26 and to a lower reed 28, including a slot 30 in between.

Joining unit 22 includes a wide zone 34 at the edge of tooth 6, and a narrow zone 36 at the center of tooth 6.

Although cylindrical recess 18 and joining unit 22 are split, tooth 6 is consolidated by a consolidating block 24, consolidating the splits of grasping unit 40 and of joining unit 22 (the holes in consolidating block 24 are not significant).

Another function of consolidating block 24 is for stabilizing opposite tooth 6, by inserting consolidating block 24 of one tooth 6 into slot 30 of an opposite tooth 6.

Tooth 6 includes a stair 80 in slot 30 between consolidating block 24 and upper reed 26 of joining unit 22, and another stair 80 between consolidating block 24 and lower reed 28. Stairs 80 provide that slot 30, between upper reed 26 and lower reed 28, will be thicker than consolidating block 24, such that soft seal 8 (shown in FIG. 1) injected into slot 30 will cover consolidating block 24.

Usually, teeth of prior art zippers include all of the above-mentioned components of tooth 6 except for stair 80.

Figure 5:
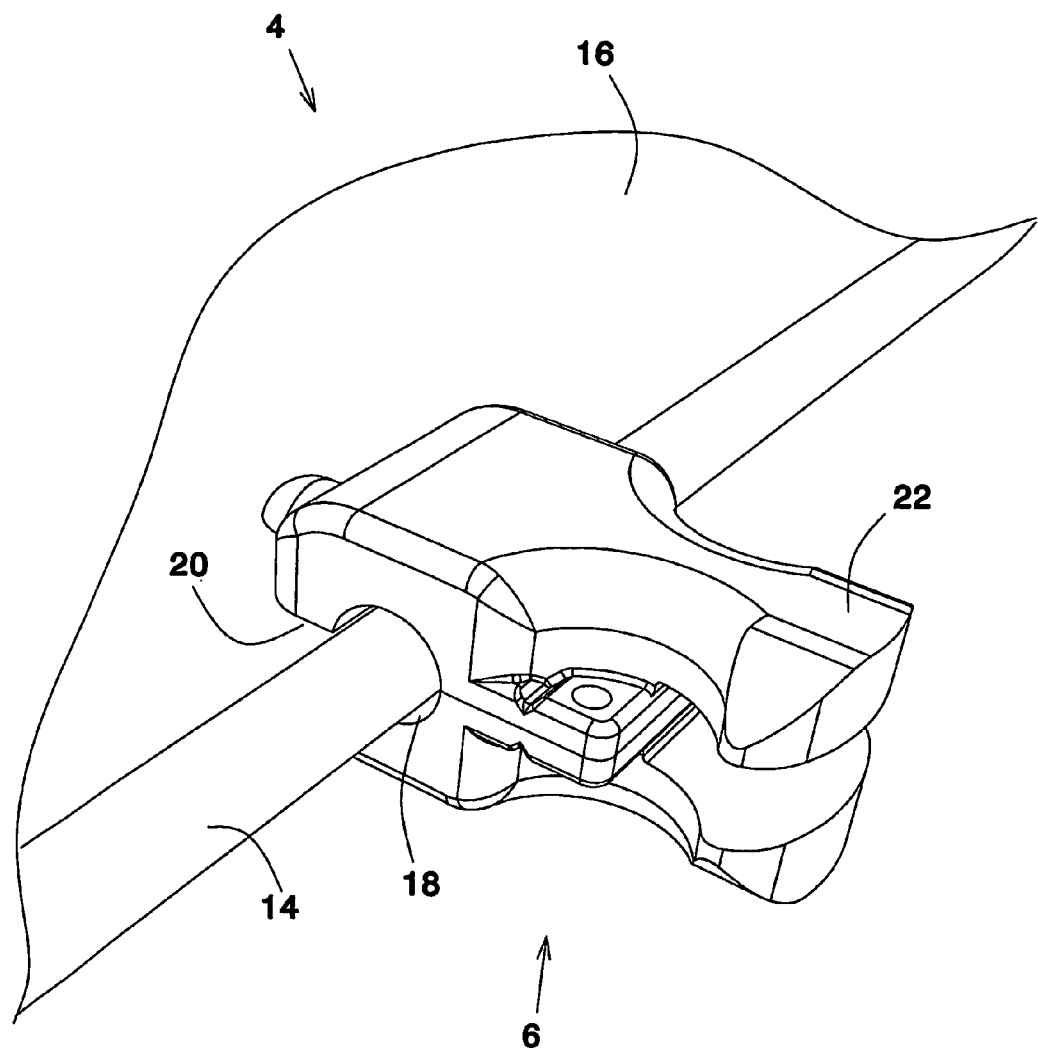
FIG. 5 shows a single tooth grasping a tape of the non-waterproof zipper or a tape of the zipper of the present invention yet not waterproof.

FIG. 5 shows a single tooth grasping a tape of the non-waterproof zipper or a tape of the zipper of the present invention yet not waterproof.

Thickened stripe 14 of tape 4 is inserted into cylindrical recess 18 of tooth 6, and thin stripe 16 of tape 4 is inserted into groove 20 of tooth 6. Waterproof zipper 2, like the non-waterproof zipper, includes the same firm grasping of tooth 6 to tape 4.

Thus tooth 6 of waterproof zipper 2 also contactably grasps tape 4, i.e there is no sealing between tape 4 and tooth 6.

Figure 6:
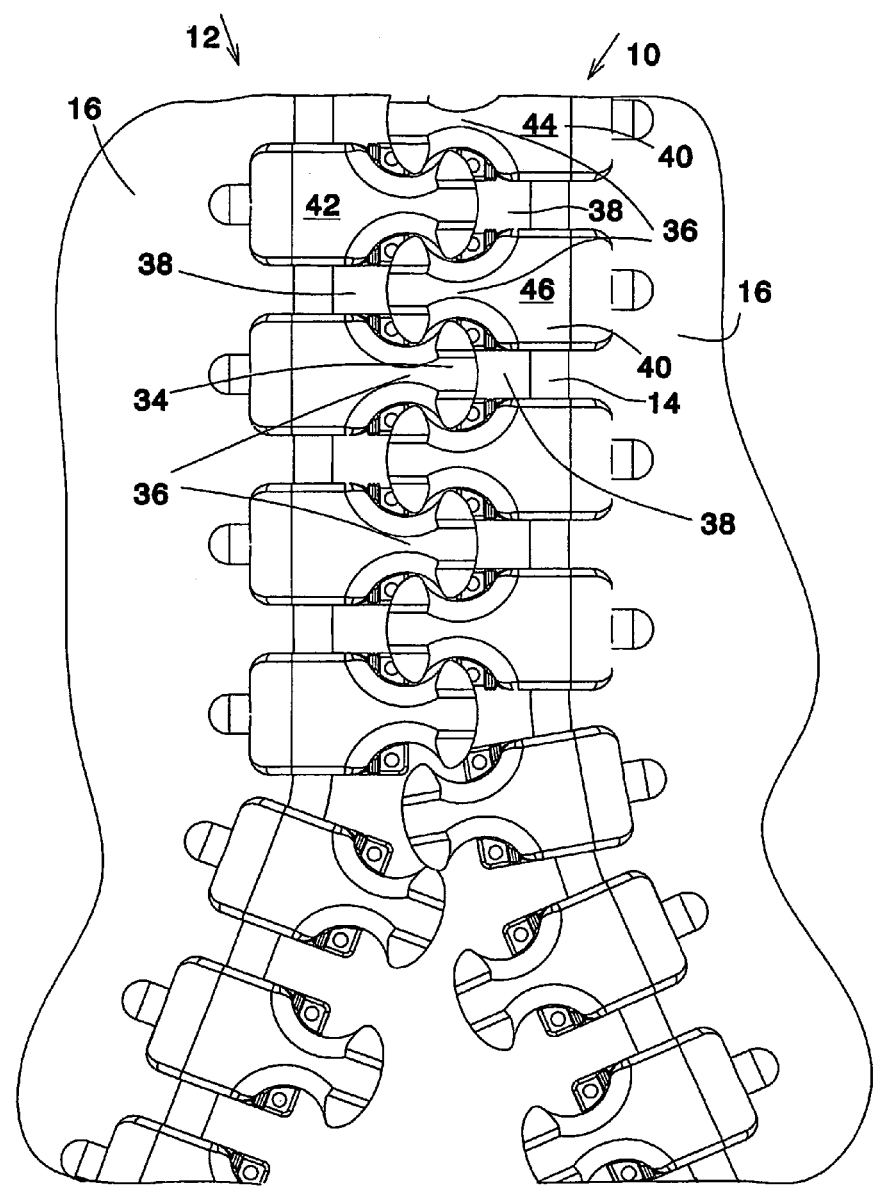
FIG. 6 is a side view of a non-waterproof zipper.

FIG. 6 is a side view of a non-waterproof zipper.

Teeth 6 of non-waterproof zipper 12 are shown joined at the upper zone 10, presenting the principal of joining the zipper. For example, wide zone 34 of tooth 42 is confined between two narrow zones 36 and wide zones 34 of teeth 44 and 46.

Teeth 6 separate between the thick stripes 14 of tapes 4, thus sealing of tapes 6 does not seal between tapes 4.

The mechanical confinement of wide zone 34 of tooth 42 might leave undesired space 38 between wide zone 34 of tooth 42 and grasping units 40 of teeth 44 and 46. Thus, non-waterproof zipper 12 is not waterproof.

Figure 7:
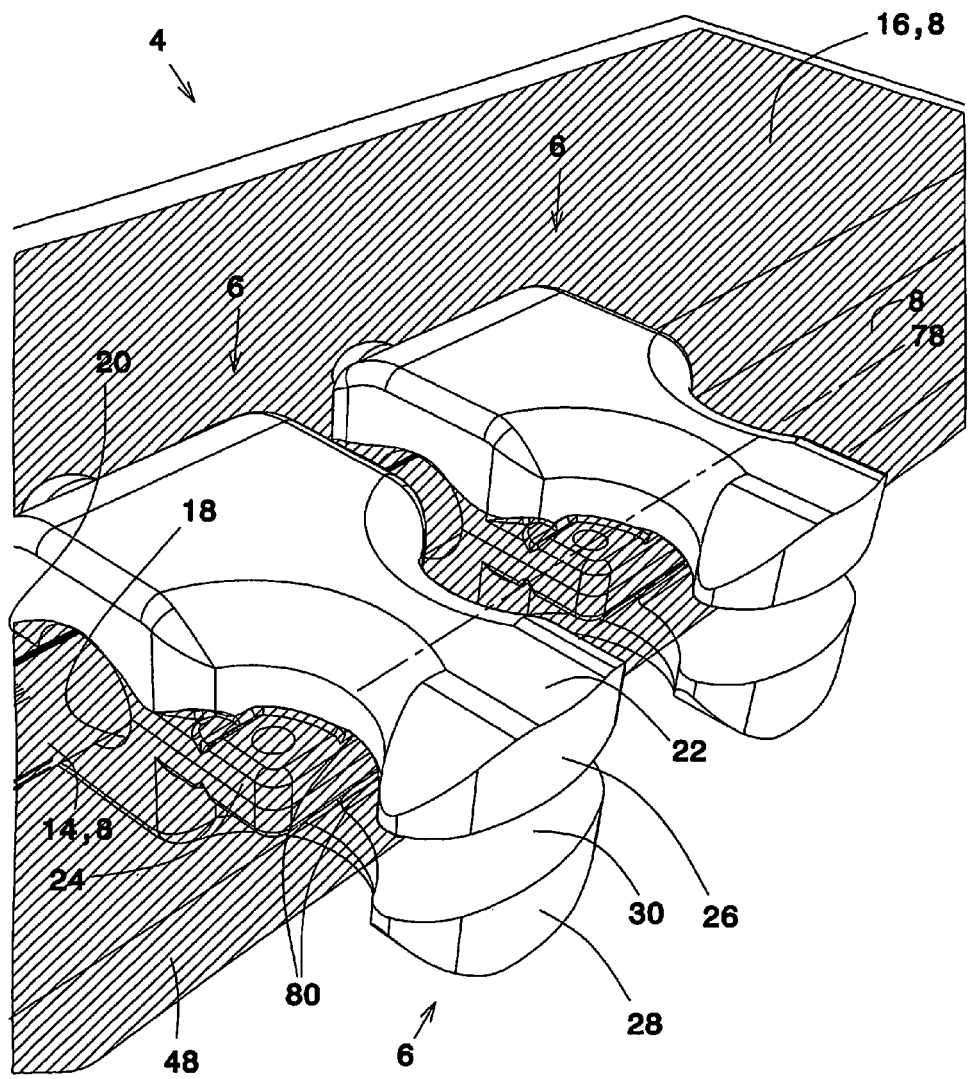
FIG. 7 shows two teeth grasping a tape of the zipper, according to one embodiment of the present invention.

FIG. 7 shows two teeth grasping a tape of the zipper, according to one embodiment of the present invention.

Waterproof zipper 2 is similar to non-waterproof zipper 12, except for an additional soft seal 8, which may require a slightly different tooth 6.

Seal 8 provides sealing of water, such that zipper 2 becomes waterproof.

Soft seal 8 may provide an additional feature of an advertisement 32 or caption functionality, or other information provision, by injecting the liquid seal in a pre-determined shape.

According to the present invention, a soft seal 8 wraps thin stripe 16 and thickened stripe 14 of tape 4. Seal 8 expands thin stripe 16 to penetrate into the internal region of slot 30, between upper reed 26 and lower reed 28.

Since slot 30 is slightly thicker than consolidating block 24 due to stairs 80, soft seal 8, injected into slot 30, also wraps consolidating block 24.

Soft seal 8 expands around tooth 6, crossing from one tooth 6 to another forming a straight border 48.

Figure 8:
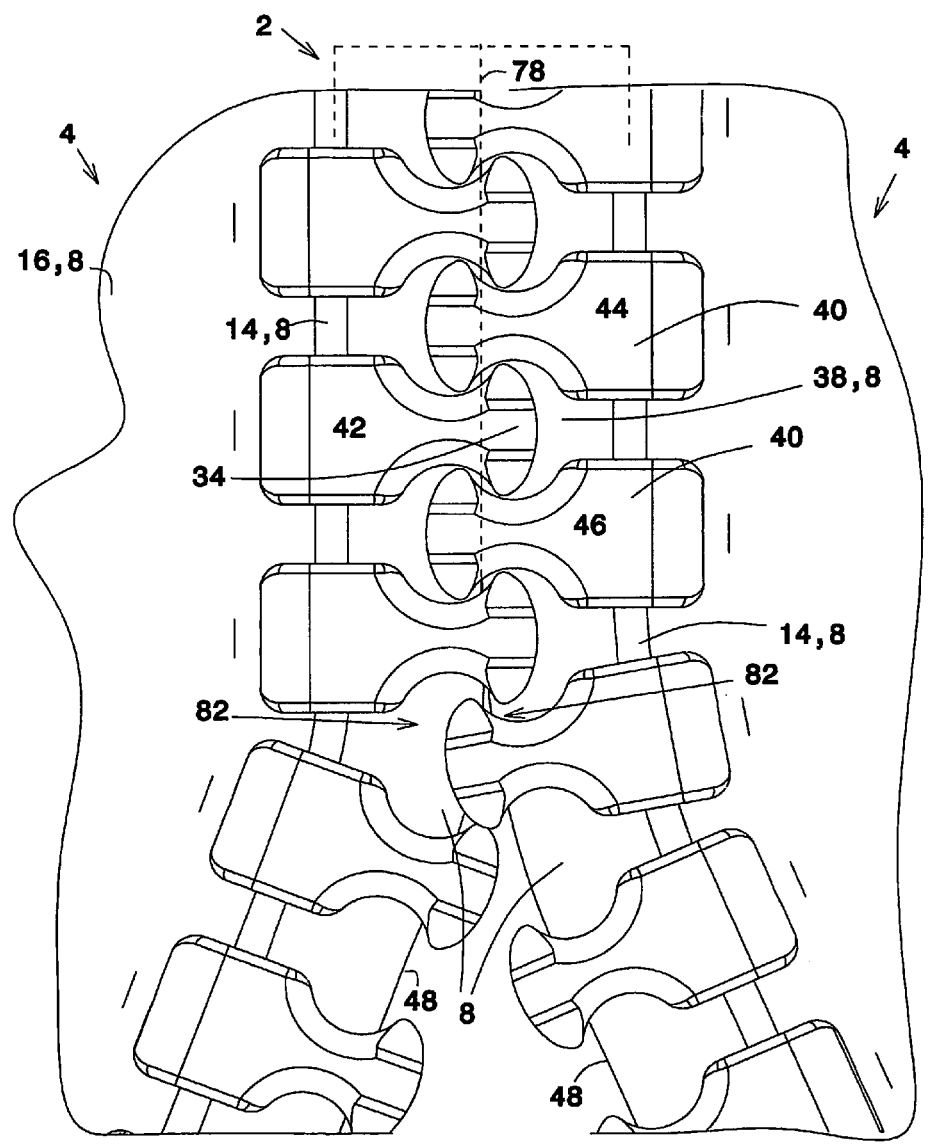
FIG. 8 is a side view of a non-waterproof zipper, according to one embodiment of the present invention.

FIG. 8 is a side view of a non-waterproof zipper, according to one embodiment of the present invention.

Seal 8 forms a continuous layer, starting from tape 4, and ending at margin 48. Thus, spaces 38 between wide zone 34 of tooth 42 and grasping units 40 of teeth 44 and 46, are also filled by seal 8, as seal 8 expands thin stripe 16.

The term "joining line", denoted by numeral 78, refers herein to the center line between the two thickened stripes 14 of the two tapes 4, or the center line between the opposite teeth 44 and 42.

The depth of the expansion, which defines border 48 of seal 8 of each tape 4, is designed to be beyond joining line 78 between tapes 4.

Teeth 6 of waterproof zipper 2, like of non-waterproof zipper 12, employ, upon closing of zipper 2, mechanical joining force 82 towards joining line 78. Since the borders 48 of the two seals 8 expand beyond joining line 78, they employ pressure one on the other, providing tight sealing on line 78. Thus zipper 2 is water proof.

The depth of the expansion of seal 8 beyond joining line 78 may be determined according to sealing considerations, depending on the elastics and other characteristics of the material of seal 8, and on the characteristics of joining force 82, produced by the teeth, including teeth 42, 44 and 46.

Figure 9:
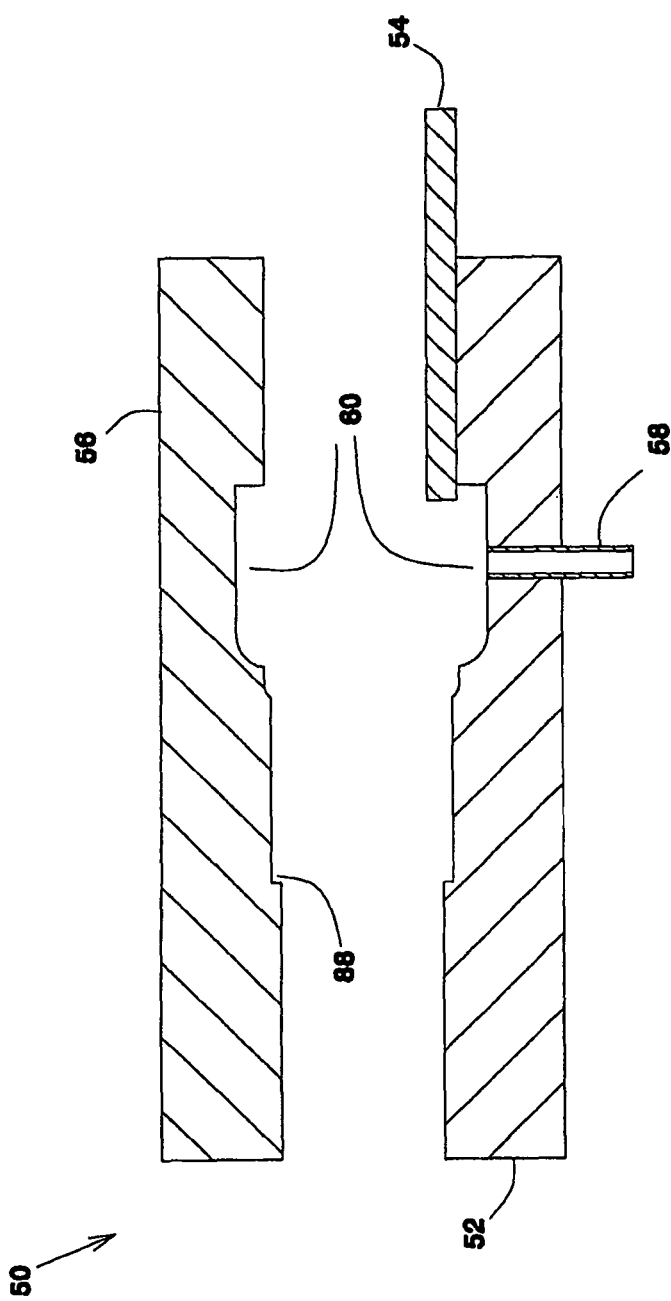
FIG. 9 is a side view of a first mold for manufacturing a non-waterproof zipper, having plastic teeth.

FIG. 9 is a side view of a first mold for manufacturing a non-waterproof zipper, having plastic teeth.

A first mold 50 includes a lower member 52, an upper member 56 and a mold insert 54 in between, having together a space 60 of the negative shape of a tooth 6 shown in FIG. 5. Mold 50 includes a pipe 58 for injecting thermoplastic into space 60.

Figure 10:
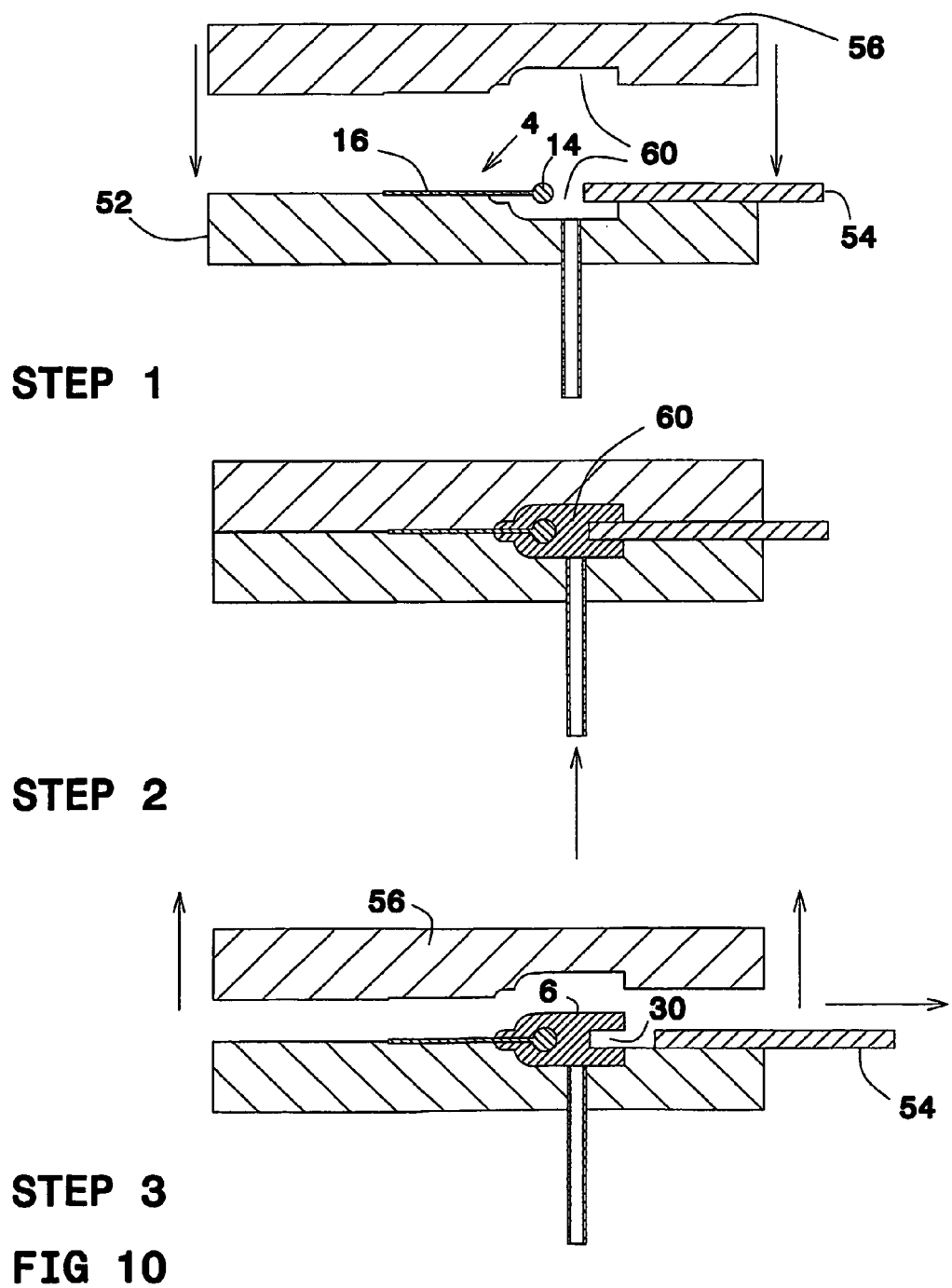
FIG. 10 shows steps of manufacturing a non-waterproof zipper, which are also the first steps of manufacturing the waterproof zipper, according to one embodiment of the present invention.

FIG. 10 shows steps of manufacturing a non-waterproof zipper, which are also the first steps of manufacturing the waterproof zipper, according to one embodiment of the present invention.

At step 1 tape 4, including wide thin stripe 16 and narrow thickened stripe 14, is placed on lower member 52 of first mold 50. It should be noted that for manufacturing waterproof zipper 2, first mold 50 should fit tooth 6.

At step 2 upper member 56 is placed on lower member 52 and on mold insert 54, forming together space 60 of the negative shape of a tooth 6.

Then thermoplastic is injected through pipe 58 into space 60.

At step 3 upper member 56 is raised revealing a new tooth 6 grasping to tape 4. Mold insert 54 is slid aside, revealing slot 30 in tooth 30.

One tape of non-waterproof zipper 12, including tape 4 with a plurality of teeth 6, is then separated from first mold 50.

If in steps 1 to 3, first mold 50 fitted teeth 6, then the process may continue to manufacture waterproof zipper 2.

Figure 11:
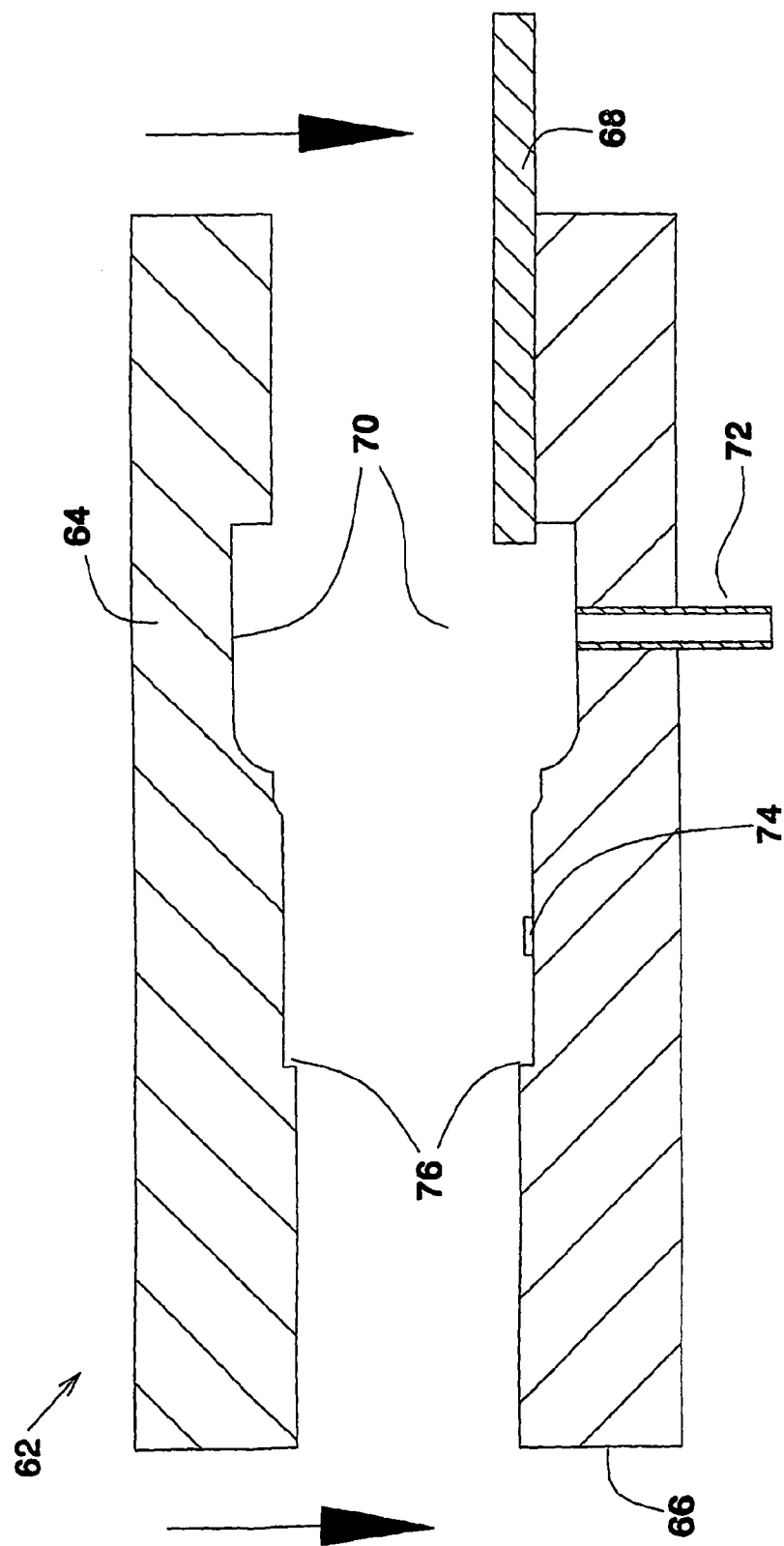
FIG. 11 is a side view of a second mold for manufacturing the inventive zipper, according to one embodiment of the present invention.

FIG. 11 is a side view of a second mold for manufacturing the inventive zipper, according to one embodiment of the present invention.

A second mold 62 includes a lower member 66, an upper member 64 and a mold insert 68 in between, forming together a space 70 shaped as the negative shape of a tape of waterproof zipper 2, as depicted in FIG. 7.

Mold 62 includes also a pipe 72 for injecting Thermoplastic Elastomer (TPE) or another soft seal 8 into space 70.

Space 72 of second mold 62 is slightly thicker than space 60 of first mold 50. For example, stair 88 of first mold 50 hardly exists, since it should contain only half of the thickness of thin stripe 16, whereas stair 76 of second mold 62 is significantly thicker, since it should also contain, except for the half of the thickness of thin stripe 16, the thickness of the upper layer of soft seal 8.

Upper mold 64 may include a stamp 32, for producing a shape or another caption on tape 4 or between teeth 6, for advertising or another purpose.

Figure 12:
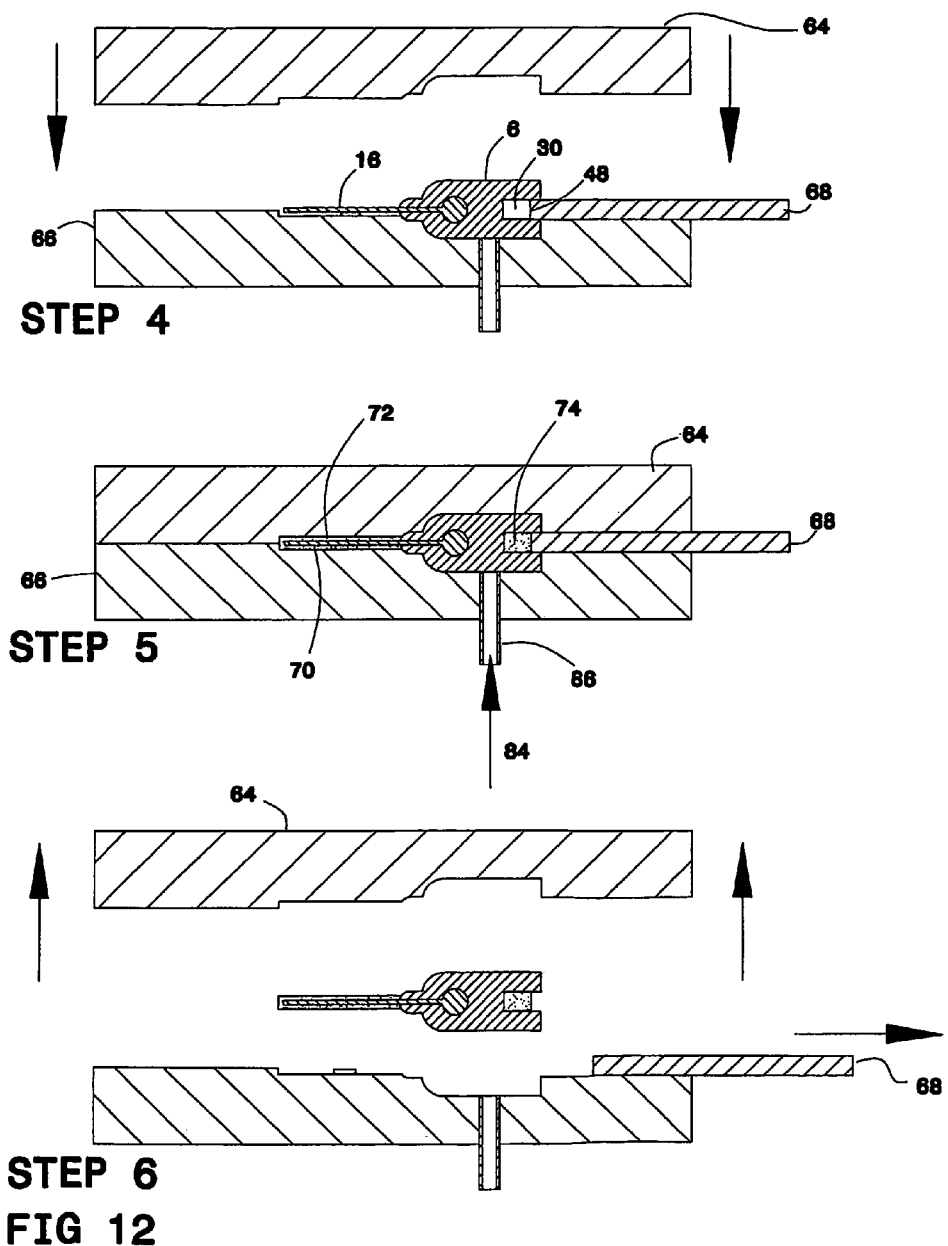
FIG. 12 shows the steps of using the second mold of FIG. 10, according to one embodiment of the present invention.

FIG. 12 shows the steps of using the second mold of FIG. 10, according to one embodiment of the present invention.

The steps of using second mold 62 are performed after the steps of using first mold 50, thus the steps of using second mold 62 are referred as starting from step no. 4.

At step 4 non-waterproof zipper 12 tape 4, including wide thin stripe 16, narrow thickened stripe 14, and prior art teeth 6 are inserted in space 70 on lower member 66 of second mold 62. Wide thin stripe 16 is raised by pins 74 of lower member 66 of second mold 62, such that TPE can penetrate below wide thin stripe 16, between pins 74.

Mold insert 68 of second mold 62 is inserted into slot 30, as deep as margin 48, thus leaving space for the soft seal to penetrate.

At step 5 upper member 64 is placed on lower member 66 and on mold insert 68. The space left includes a thin space 70 below wide thin stripe 16, a thin space 72 above wide thin stripe 16, the space left in slot 30 by mold insert 68, and the other areas depicted in FIGS. 7 and 1.

Then TPE or another liquid seal 84 is injected through pipe 86 into spaces 70, 72, 74, and the other areas depicted in FIGS. 7 and 1.

At step 6, after liquid seal 84 solidifies, becoming soft seal 8, upper member 64 is raised and mold insert 68 is slid aside, revealing one tape of waterproof zipper 2.

According to manufacturing steps 1 to 6, it may be appreciated that waterproof zipper 2 includes the mechanical advantaged features of non-waterproof zipper 12.

Waterproof zipper 2, like non-waterproof zipper 12, includes the firm grasping of tooth 6 to tape 4, provided by injecting seal 8 (steps 4,5,6) after the manufacturing of teeth 6 (at steps 1,2,3).

Waterproof zipper 2, like non-waterproof zipper 12, also includes the stabilization between adjacent and opposite teeth 6, provided by sufficient thin seal 8, injected at the regions of consolidating block 24, which, like in the non-waterproof zipper, stabilize the adjacent and opposite tooth 6 together.

In the figures and description herein, the following reference numerals and symbols have been mentioned:

numeral 2 denotes a waterproof zipper according to one embodiment of the present invention;
numeral 4 denotes a tape of a zipper;
numeral 6 denotes a tooth of the waterproof zipper;
numeral 8 denotes a soft seal;
numeral 10 denotes the fastened zone of a zipper;
numeral 12 denotes a non-waterproof zipper, which may include the prior art zipper of the zipper of the present invention prior to adding the soft seal;
numeral 14 denotes the narrow thickened stripe 14 of the tape of a zipper, also named "cordell";
numeral 16 denotes the wide thin stripe of the tape of a zipper, which is sewn to a fabric;
numeral 18 denotes a cylindrical recess in the tooth;
numeral 20 denotes a groove in the tooth;
numeral 22 denotes the joining unit of a tooth;
numeral 24 denotes the consolidating block of the tooth;
numeral 26 denotes the upper reed of the slot of the tooth;
numeral 28 denotes the lower reed of the slot of the tooth;
numeral 30 denotes the slot of the tooth;
numeral 32 denotes a stamp or a caption on the soft seal;
numeral 34 denotes the wide zone of the joining unit of the tooth;
numeral 36 denotes the narrow zone of the joining unit of the tooth;
numeral 38 denotes an undesired space between teeth, through which water can penetrate, unless having a waterproof seal;
numeral 40 denotes the grasping unit of the tooth;
numerals 42, 44 and 46 denote certain teeth;
numeral 48 denotes the border of the soft seal;
numeral 50 denotes a first mold, for producing teeth on a tape;
numeral 52 denotes a lower member of the first mold;
numeral 54 denotes a mold insert of the first mold;
numeral 56 denotes an upper member of the first member;
numeral 58 denotes a pipe for injecting the thermoplastic for producing the tooth;
numeral 60 denotes a space in the first mold;
numeral 62 denotes a second mold;
numeral 64 denotes an upper member of the second mold;
numeral 66 denotes a lower member of the second mold;
numeral 68 denotes a mold insert of the second mold;
numeral 70 denotes the space formed by the second mold;
numeral 72 denotes a pipe for injecting the soft seal;

numeral 74 denotes pins in the second mold for raising the tape in the second mold;

numeral 76 denotes a stair in the second mold;

numeral 78, named "joining line", denotes the center line between the tapes;

numeral 80 denotes a stair in the slot of the tooth;

numeral 82 denotes mechanical force, employed by the teeth towards the center of the zipper, by being joined;

numeral 84 denotes a liquid seal, which becomes the soft seal after solidifying;

numeral 86 denotes a pipe of the second mold; and numeral 88 denotes a stair in the first mold.

The foregoing description and illustrations of the embodiments of the invention has been presented for the purposes of illustration. It is not intended to be exhaustive or to limit the invention to the description above in any form.

What is claimed is:

1. A waterproof zipper comprising:

two tapes, each said tape having a lateral tape edge, an upper tape surface and a lower tape surface, said lateral tape edges of the two said tapes being in general facing relationship with one another in said zipper;

joining teeth, each consolidated by a consolidating block and directly contactably grasping each respective said tape over a respective tape contact zone, and separating one said tape from the opposite said tape;

each consolidating block projecting laterally beyond the respective said lateral tape edge; and two soft seals, each seal wrapping and expanding one or the other of said two tapes beyond a joining line of said tapes and defining a seal edge projecting beyond said joining line, such that said seal edges of the two said tapes are in general facing relationship with one another in said zipper and capable of abutting one another to provide a seal responsive to the zipper being closed;

said soft seal including soft seal layers applied to each one of said upper tape surface and lower tape surface, excluding the respective said tape contact zones, wherein in use, the zipper is reversibly closed thereby applying pressure between the respective said seal edges of the respective said soft seals at said joining line, resulting in sealing of said two soft seals.

2. The zipper according to claim 1, wherein said soft seal penetrates into each of said teeth beyond the thickness of said consolidating block of each of said teeth.

3. The zipper according to claim 2, wherein each of said joining teeth comprises a slot at a joining unit thereof, allowing said penetration of said soft seal therein.

4. The zipper according to claim 3, wherein a distance between reeds of said slot is larger than the thickness of said consolidating block, for allowing said penetration of said soft seal into said slot beyond said thickness of said consolidating block.

5. The zipper according to claim 4, further comprising an upper stair and a lower stair between said slot and said consolidating block.

6. The zipper according to claim 1, wherein said soft seal expands between adjacent teeth of said tape.

7. The zipper according to claim 1, wherein the material of said soft seal comprises Thermoplastic Elastomer (TPE).

8. The zipper according to claim 1, wherein said soft seal further comprises a stamp, for providing information.

9. The zipper according to claim 1, wherein each said tooth comprises an upper reed and a lower reed, defining a slot in-between, the slot accommodating therein a portion of the respective said seal edge.

\* \* \* \* \*